(12) United States Patent
Lian et al.

(10) Patent No.: US 11,036,990 B2
(45) Date of Patent: Jun. 15, 2021

(54) TARGET IDENTIFICATION METHOD AND APPARATUS, AND INTELLIGENT TERMINAL

(71) Applicant: CLOUDMINDS (BEIJING) TECHNOLOGIES CO., LTD., Beijing (CN)

(72) Inventors: Shiguo Lian, Beijing (CN); Zhaoxiang Liu, Beijing (CN); Ning Wang, Beijing (CN)

(73) Assignee: CLOUDMINDS (BEIJING) TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 16/818,837

(22) Filed: Mar. 13, 2020

(65) Prior Publication Data

US 2020/0218897 A1  Jul. 9, 2020

Related U.S. Application Data

(63) Continuation of application No. PCT/CN2017/101966, filed on Sep. 15, 2017.

(51) Int. Cl.
*G06K 9/00* (2006.01)
*B25J 9/16* (2006.01)

(52) U.S. Cl.
CPC ........ *G06K 9/00671* (2013.01); *B25J 9/1697* (2013.01)

(58) Field of Classification Search
CPC .............. B25J 9/1697; G06K 9/00288; G06K 9/00671; G06K 9/6281; G06K 9/6292; G06N 3/02
See application file for complete search history.

(56) References Cited

U.S. PATENT DOCUMENTS

2007/0177805 A1* 8/2007 Gallagher ............... G06F 16/58
382/190
2008/0112621 A1* 5/2008 Gallagher .......... G06K 9/00288
382/190

(Continued)

FOREIGN PATENT DOCUMENTS

| CN | 1102521558 A | 6/2012 |
|---|---|---|
| CN | 105844283 A | 8/2016 |
| CN | 106934817 A | 7/2017 |

OTHER PUBLICATIONS

International Search Report dated Jun. 14, 2018; PCT/CN2017/101966.

(Continued)

*Primary Examiner* — David Bilodeau

(57) ABSTRACT

A target identification method includes: using information of a to-be-detected target acquired within a predetermined time period as judgment information; acquiring an identification result of the to-be-detected target at a current time and outputting the identification result; judging whether the attribute type corresponding to the identification result is an attribute type having the highest priority; and if the attribute type corresponding to the identification result is not the attribute type having the highest priority, using information of the to-be-detected target acquired within a next predetermined time period as the judgment information, and returning to the step of acquiring an identification result of the to-be-detected target at a current time and outputting the identification result.

18 Claims, 3 Drawing Sheets

(56) References Cited

U.S. PATENT DOCUMENTS

| | | |
|---|---|---|
| 2011/0116685 A1 | 5/2011 | Sugita |
| 2012/0139950 A1 | 6/2012 | Sogo |
| 2013/0027569 A1* | 1/2013 | Parulski ............. H04N 5/23219 348/207.1 |
| 2013/0027571 A1* | 1/2013 | Parulski ................ H04N 5/232 348/207.11 |
| 2013/0262565 A1 | 10/2013 | Nakamura et al. |
| 2019/0098005 A1* | 3/2019 | Joshi .................... G06F 3/0346 |

OTHER PUBLICATIONS

1st Office Action dated Aug. 13, 2018 by the CN Office; Appln.No. 2017800025852.

* cited by examiner

US 11,036,990 B2

TARGET IDENTIFICATION METHOD AND APPARATUS, AND INTELLIGENT TERMINAL

CROSS-REFERENCE TO RELATED APPLICATIONS

This application is a continuation of International Application No. PCT/CN2017/101966, with an international filing date of Sep. 15, 2017, the entire contents of which are incorporated herein by reference.

TECHNICAL FIELD

Embodiments of the present application relate to the technical field of intelligent identifications, and in particular, relate to a target identification method and apparatus, and an intelligent terminal.

BACKGROUND

With promotion of machine intelligence, interactions between human and intelligent terminals become more and more frequent. Natural experience in human-machine interactions is also getting more and more important. Two important factors affecting the natural experience of human-machine interactions are timeliness and detail degree of identification of a to-be-detected target by the intelligent terminals.

At present, most of the intelligent terminals are expected to output identification results with a higher detail degree, such as names, models (or series) of vehicles, vehicle numbers, categories of cats to improve human-machine interaction experience.

However, in practical scenarios, environments are ever changing, but the identification capabilities of the intelligent terminals are limited. In some scenarios, to acquire a more detailed identification result, the intelligent terminals may need to spend more time to acquire and analyze more information. In this case, timeliness will be unavoidable sacrificed, if the intelligent terminals are required to output a highly detailed recognition result; on the contrary, it is possible to get only a low level recognition result, if the recognition result must be output within a time, which is also not conducive to the human-machine interaction experience.

Therefore, how to achieve a compromise between the timeliness and detail of target recognition is an urgent problem to be solved by traditional intelligent recognition technologies.

SUMMARY

The first aspect of the disclosure provides a target identification method, applied to an intelligent terminal. The method includes: using information of a to-be-detected target acquired within a predetermined time period as judgment information, the to-be-detected target including at least two attribute types, a priority relationship being defined between the at least two attribute types; acquiring an identification result of the to-be-detected target at a current time based on the judgment information and data acquired prior to acquisition of the judgment information and outputting the identification result, the identification result corresponding to one of the attribute types; judging whether the attribute type corresponding to the identification result is an attribute type having the highest priority in the at least two attribute types; and if the attribute type corresponding to the identification result is not the attribute type having the highest priority in the at least two attribute types, using information of the to-be-detected target acquired within a next predetermined time period as the judgment information, and returning to the step of acquiring an identification result of the to-be-detected target at a current time based on the judgment information and data acquired prior to acquisition of the judgment information and outputting the identification result.

The second aspect of the disclosure provides an intelligent terminal. The intelligent terminal includes: at least one processor; and a memory communicably connected to the at least one processor; wherein the memory stores instructions executable by the at least one processor, wherein, the instructions, when being executed by the at least one processor, cause the at least one processor to perform the steps of: using information of a to-be-detected target acquired within a predetermined time period as judgment information, the to-be-detected target including at least two attribute types, a priority relationship being defined between the at least two attribute types; acquiring an identification result of the to-be-detected target at a current time based on the judgment information and data acquired prior to acquisition of the judgment information and outputting the identification result, the identification result corresponding to one of the attribute types; judging whether the attribute type corresponding to the identification result is an attribute type having the highest priority in the at least two attribute types; and if the attribute type corresponding to the identification result is not the attribute type having the highest priority in the at least two attribute types, using information of the to-be-detected target acquired within a next predetermined time period as the judgment information, and returning to the step of acquiring an identification result of the to-be-detected target at a current time based on the judgment information and data acquired prior to acquisition of the judgment information and outputting the identification result.

The third aspect of the disclosure provides a non-transitory computer readable storage medium. The non-transitory computer-readable storage medium stores computer-executable instructions, which, when being executed by an intelligent terminal, cause the intelligent terminal to perform the steps of: using information of a to-be-detected target acquired within a predetermined time period as judgment information, the to-be-detected target including at least two attribute types, a priority relationship being defined between the at least two attribute types; acquiring an identification result of the to-be-detected target at a current time based on the judgment information and data acquired prior to acquisition of the judgment information and outputting the identification result, the identification result corresponding to one of the attribute types; judging whether the attribute type corresponding to the identification result is an attribute type having the highest priority in the at least two attribute types; and if the attribute type corresponding to the identification result is not the attribute type having the highest priority in the at least two attribute types, using information of the to-be-detected target acquired within a next predetermined time period as the judgment information, and returning to the step of acquiring an identification result of the to-be-detected target at a current time based on the judgment information and data acquired prior to acquisition of the judgment information and outputting the identification result.

BRIEF DESCRIPTION OF THE DRAWINGS

One or more embodiments are illustrated by way of example, and not by limitation, in the figures of the accom

DETAILED DESCRIPTION

Figure 1:
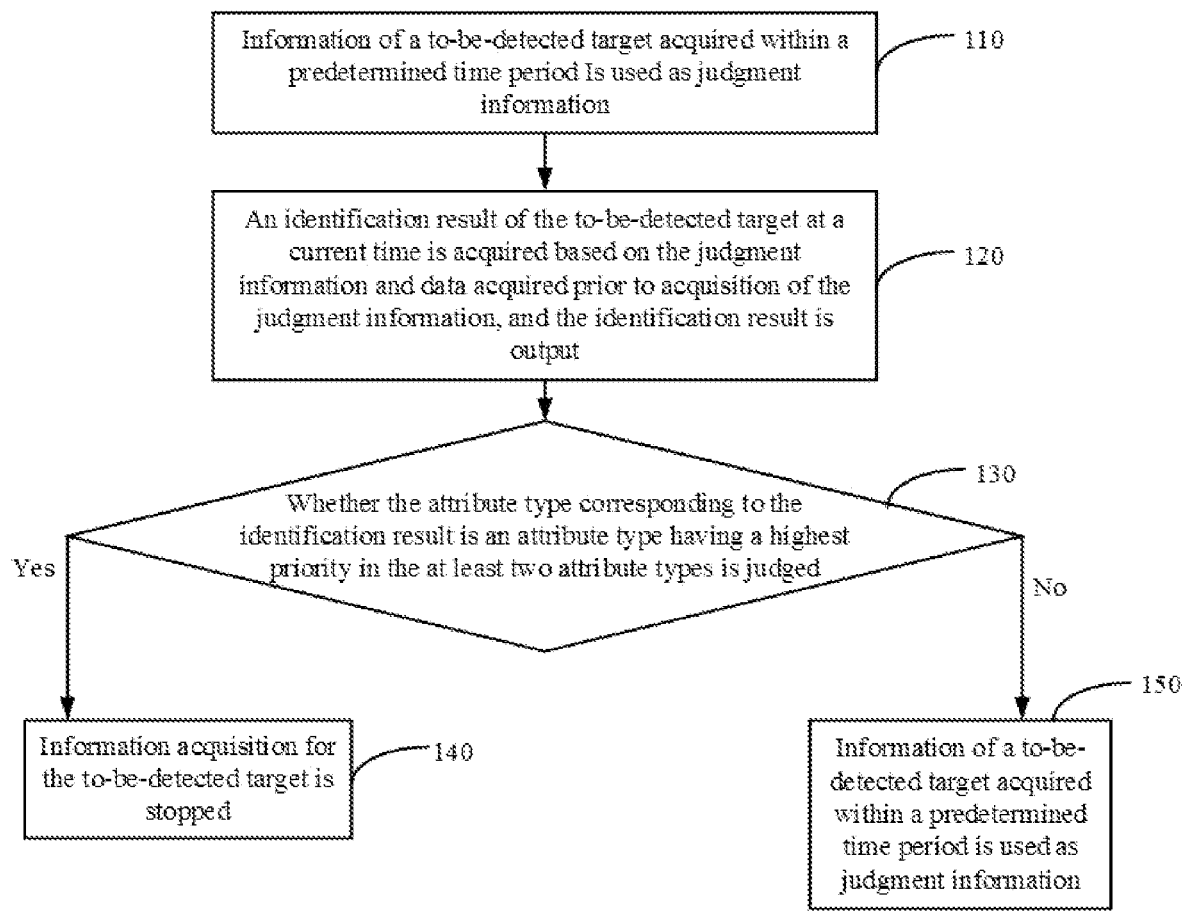
- FIG. 1 is a schematic flowchart of a target identification method according to an embodiment of the present application.

For clearer descriptions of the objectives, technical solutions, and advantages of the present application, the detailed information of present application is further described with reference to specific embodiments and attached drawings. It should be understood that the specific embodiments described herein are only intended to explain the present application instead of limiting the present application.

It should be noted that, in the absence of conflict, embodiments of the present application and features in the embodiments may be incorporated, which all fall within the protection scope of the present application. In addition, although logic function module division is illustrated in the schematic diagrams of apparatuses, and logic sequences are illustrated in the flowcharts, in some occasions, steps can be performed in a different order than the steps shown or described in module division of the device, or the order in the flowchart.

The embodiments of the present application provide a target identification method and apparatus, and an intelligent terminal, which may be applicable to any application field relevant to target identification, for example, smart blind guiding, courtesy robots, service robots, intrusion object detection, semantic identification or the like, and in particular applicable to the application fields such as smart blind guiding, courtesy robots, service robots and the like where human-machine interaction experience is much concerned.

The target identification method according to the embodiments of the present application is a smart optimized identification method that can output identification results timely based on the information collected within a preset time period, and capable of determining whether to continue information acquisition to further optimize details of target identification based on the "priority" of the attribute type corresponding to the identification result acquired at a current time. Based on different detail degrees in the description of the target under test, attributes of the to-be-detected target are categorized into a plurality of attribute types with priorities (wherein an identification result corresponding to an attribute type having a higher priority has a higher detail degree). In addition, during identification, information of the to-be-detected target acquired within a predetermined time period is used as judgment information; an identification result of the to-be-detected target at a current time is acquired and output based on the judgment information and data acquired prior to acquisition of the judgment information. If the priority of the attribute type corresponding to the identification result acquired at the current time is not the highest priority, that is, if the identification result acquired at the current time is not a most detailed identification result, information of the to-be-detected target is continuously acquired within a next predetermined time period, and the information is used as the judgment information. By repeating the above identification step and judgment step, an identification result of the to-be-detected target may be timely output in different identification scenarios. In addition, if the acquired identification result is not the most detailed identification result, with accumulation of the information acquisition time, a more detailed identification result may be output gradually based on more abundant information, such that a compromise may be reached between timeliness and detail degree of the target identification, and hence user experience may be enhanced.

Accordingly, with the target identification method, apparatus, and the intelligent terminal thereof according to the embodiments of the present application, during identification of the same person/object (to-be-detected target), in different identification environments, an identification result of the to-be-detected target may be timely output, and in addition, as times goes by, a more and more detailed identification result may be output. However, it should be noted that, in different identification environments, the intelligent terminal may output identification results having different detail degrees within the same predetermined time period.

Using identification of a person based on an acquired image as an example, in an identification environment where the light is good, the distance is small and a to-be-detected person just faces up a camera of the intelligent terminal, the intelligent terminal may acquire a clear face image within a first predetermined time period (for example, a first 5s time period, that is, within 5s after the intelligent terminal is triggered to acquire information), and hence may identify the "name" of the to-be-detected person based on the clear face image. In this case, the intelligent terminal may output the "name" of the to-be-detected person to interact with the user. In addition, since in this case a most detailed identification result has been acquired, information acquisition for the to-be-detected person may be stopped. In some other identification environment, for example, within the first predetermined time period (for example, the first 5s time period) where the intelligent terminal acquires the information, the to-be-detected person faces sideways relative to the camera, the intelligent terminal may only acquire a side face image of the to-be-detected person, and hence identify the "gender" of the to-be-detected person based on the side face image. In this case, the intelligent terminal outputs a first identification result indicating the "gender" of the to-be-detected person for timely feedback to the user. In addition, since the "gender" is not the most detailed identification result, in the embodiments of the present application, the intelligent terminal may continuously acquire the information of the to-be-detected person within a second predetermined time period (for example, a second 5s time period). If the intelligent terminal may acquire a front face image of the to-be-detected person within the second predetermined time period, the intelligent terminal may identify the "name" of the to-be-detected person based on the side face image acquired within the first predetermined time period and the front face image acquired within the second predetermined time period, and hence output a second identification result indicating the "name" of the to-be-detected person. In this way, a more detailed identification result may be obtained, such that the intelligent terminal may conveniently further adjust content interacted with the user, and user experience can be enhanced.

The target identification method and apparatus according to the embodiments of the present application may be applied to all types of intelligent terminals, for example, a robot, blind guiding glasses, a smart helmet, a smart phone, a tablet computer, a server or the like. The intelligent terminal may include any suitable type of storage media for storing data, for example, a magnetic tape, a compact disc-read only memory (CD-ROM), a read-only memory (ROM), a random access memory (RAM) or the like. The intelligent terminal may further include one or a plurality of logic operation modules, which singly or parallelly perform any suitable type of functions or operations in a single-thread or multi-thread fashion, for example, checking a database, processing an image or the like. The logic operation modules may be any suitable type of electronic circuits or patch electronic devices capable of performing logic operation, for example, a single-core processor, a multi-core processor, a graphics processing unit (GPU) or the like.

Hereinafter the embodiments of the present application are further illustrated with reference to the accompanying drawings.

Embodiment 1

FIG. 1 is a schematic flowchart of a target identification method according to an embodiment of the present application. The method may be performed by any type of intelligent terminals. Specifically, referring to FIG. 1, the method includes, but not limited to, the following steps:

Step 110: Information of a to-be-detected target acquired within a predetermined time period is used as judgment information.

In this embodiment, the "to-be-detected target" may include, but not limited to, a human being, an animal, an object or the like. At least two different hierarchies of attribute types may be assigned to the to-be-detected target based on different detail degrees of description of the to-be-detected target, and priorities may be assigned to the attribute types based on the detail degrees of the description of the to-be-detected target. It may be considered that the attribute type having a greater identification difficulty corresponds to a high detail degree, and the identification difficulties may be ranked (for example, generally, name identification is more difficult than gender identification, and gender identification is more difficult than face/body identification) based on identification rates of identification algorithms for different attribute types under the same condition (for example, under the condition that the same picture is input); or the identification difficulties may also be ranked based on a mutual inclusion relationship between the attribute types (for example, before the gender identification, the face needs to be identified first). For example, assuming that the to-be-detected target is a person, based on different detail degrees of the description of the to-be-detected target, attribute types of the person may be defined as: "name", "gender" and "whether a person or not", and based on the identification difficulties, a priority sequence of the attribute types may be defined as: L1 (name)>L2 (gender)>L3 (whether a person or not).

In this embodiment, the intelligent terminal may constantly acquire the information of the to-be-detected target, and output identification results of the to-be-detected target at a plurality of predetermined time nodes. In this case, the "predetermined time period" is a time period between one of the plurality of predetermined time nodes during the target identification and a previous predetermined time node thereof. The time period may be any time period during the process that the intelligent terminal acquires the information. In addition, in this embodiment, the "information" acquired by the intelligent terminal is a judgment basis which may reflect the attribute of the to-be-detected target, and based on the information, the attribute of the to-be-detected target may be identified. The information may include, but not limited to: image information, sound information, thermal infrared picture, near infrared picture, ultrasonic signal, electromagnetic reflected signal and the like, which may be acquired by one or a plurality of sensors. For example, the image information of the to-be-detected target may be acquired by a camera, the sound information of the to-be-detected target may be acquired by a microphone, and the thermal infrared picture of the to-be-detected target may be acquired by a thermal infrared sensor and the like.

For example, assuming that the intelligent terminal acquires a back image a1 of the to-be-detected person within a time period (0, t1), and acquires a side face image a2 of the to-be-detected person within a time period (t1, t2), and acquires a front face image a3 of the to-be-detected person within a time period (t2, T), wherein 0<t1<t2<T. Then, the "information of the to-be-detected target acquired within the predetermined time period" in step 110 may be the back image a1 acquired by the intelligent terminal within the time period (0, t1), or may be the side face image a2 acquired by the intelligent terminal within the time period (t1, t2), or may be the front side image a3 acquired by the intelligent terminal within the time period (t2, T).

In this embodiment, during identification of the to-be-detected target, the intelligent terminal may be set to constantly acquire the information of the to-be-detected target based on the actual conditions, and perform target identification at a particular time node. Specifically, during the target identification at a time node, the information of the to-be-detected target acquired by the intelligent terminal within a time period between the current time node and the previous time node may be used as the judgment information, and the intelligent terminal may acquire an identification result of the to-be-detected target at the time node by performing step 120 based on the judgment information. For example, the intelligent terminal may be set to perform the target identification at t1, t2 and T using the moment when an information acquisition instruction is received as a start time node (that is, time 0). In this case, at t1, the information of the to-be-detected target acquired within the time period (0, t1) may be used as the judgment information, and based on the judgment information, an identification result of the to-be-detected target at t1 may be acquired by performing step 120; at t2, the information of the to-be-detected target acquired within the time period (t1, t2) may be used as the judgment information, and based on the judgment information, an identification result of the to-be-detected target at t2 may be acquired by performing step 120; and at T, the information of the to-be-detected target acquired within the time period (t2, T) may be used as the judgment information, and based on the judgment information, an identification result of the to-be-detected target at T may be acquired by performing step 120. It may be understood that in practice, time periods between any two time nodes may be equal (that is, the target identification is performed periodically), or may be unequal, which is not limited in the embodiment of the present application.

Step 120: An identification result of the to-be-detected target at a current time is acquired based on the judgment information and data acquired prior to acquisition of the judgment information, and the identification result is output.

In this embodiment, at a particular time node, the target identification is performed based on the judgment information acquired within the predetermined time period prior to the time node and the data acquired prior to acquisition of the judgment information. The "judgment information" may be information that is acquired by the intelligent terminal within any predetermined time period for acquiring an identification result of the to-be-detected target at the current time. The "current time" refers to the time when acquisition of the judgment information is completed and the target identification is performed based on the judgment information. The "data acquired prior to acquisition of the judgment information" may be information of the to-be-detected target acquired prior to acquisition of the judgment information, or may be an identification result (that is, an identification result that has been acquired prior to the current time) acquired prior to acquisition of the judgment information. For example, assuming that the acquired judgment information is the side face image a2 acquired by the intelligent terminal within the time period (t1, t2), then t2 when acquisition of the side face a2 is completed is the "current time", and the "data acquired prior to acquisition of the judgment information" is data acquired prior to t1 (including t1). The data may be the back image a1 acquired within the time period (0, t1), or may be the identification result acquired by the intelligent terminal at t1.

In this embodiment, the "identification result" corresponds to one of the attribute types of the to-be-detected target. For example, using identification of a person as an example, the attribute types include: "name", "gender" and "whether a person or not"; if the acquired identification result is "Mr. Si", the attribute type corresponding to the identification result "Mr. Li" is "name"; if the acquired identification result is "male", the attribute type corresponding to the identification result "male" is "gender"; and if the acquired identification result is "person", the attribute type corresponding to the identification result "person" is "whether a person or not". In addition, for the sake of outputting a most detailed identification result while satisfying the timeliness requirement of the target identification, in this embodiment, at each time node where the target identification is performed (that is, where step 120 is performed), the most detailed identification result is acquired based on the acquired judgment information and the data acquired prior to acquisition of the judgment information (that is, an operation is performed for the judgment information and the data to obtain a judgment result corresponding to the attribute type having the highest priority). For example, at a time node, based on the acquired judgment information and the data acquired prior to acquisition of the judgment information, a judgment result "human", "male" and "Mr. Li" may be acquired, wherein the attribute type "name" corresponding to "Mr. Li" has the highest priority. Therefore, in this case, an identification result "Mr. Li" may be acquired and output.

Specifically, in this embodiment, based on the judgment information and the data acquired prior to acquisition of the judgment information, a specific implementation manner for acquiring the identification result of the to-be-detected target at the current time may be included but not limited to the following three implementation manners:

In one implementation manner, the data acquired prior to acquisition of the judgment information includes the information of the to-be-detected target acquired prior to acquisition of the judgment information. In this case, the identification result of the to-be-detected target at the current time may be acquired in a "feature fusion" fashion.

Specifically, firstly, features of the judgment information and the information of the to-be-detected target acquired prior to acquisition of the judgment information are fused, and then the identification result of the to-be-detected target at the current time is acquired based on a fused feature. Specifically, the features for identifying the attributes of the to-be-detected target may be extracted from the judgment information acquired within different time periods, and the features may be fused. Afterwards, by a suitable identification algorithm, for example, a neural network algorithm, the identification result of the to-be-detected target at the current time is acquired based on the fused feature.

In another implementation manner, the data acquired prior to acquisition of the judgment information includes an identification result acquired prior to acquisition of the judgment information. In this case, the identification result of the to-be-detected target at the current time may be acquired in a "result fusion" fashion.

Specifically, firstly, an identification result corresponding to the judgment information is acquired; and then an identification result corresponding to the attribute type with the highest priority is selected from the identification result corresponding to the judgment information and the identification result acquired prior to acquisition of the judgment information as the identification result of the to-be-detected target at the current time. Wherein, acquiring the identification result corresponding to the judgment information is acquiring the identification result of the to-be-detected target based on the judgment information. For example, if the identification results acquired prior to acquisition of the judgment information include: "person" and "male", and the identitication result acquired based on the judgment information acquired at the current time is "male", the identification result "male" (corresponding to the attribute type having the highest priority) may be selected from these three identification results "person", "male" and "male" as the identification result of the to-be-detected target at the current time.

In still another implementation manner, if the current time is a first time node for target identification, for example, the acquired judgment information is the information of the to-be-detected target acquired within the time period (0, t1), no data is acquired prior to acquisition of the judgment information. In this case, the identification result of the to-be-detected target at the current time may be acquired only based on the acquired judgment information. That is, in this embodiment, the identification result corresponding to the judgment information is the identification result of the to-be-detected target at the current time.

Particularly, in some embodiments, for the sake of reliability of the identification result while timeliness and detail degrees of the target identification is ensured, the judgment result corresponding to each attribute type of the to-be-detected target is provided with a confidence for characterizing the reliability (or credibility) of the judgment result. The identification result acquired in step 120 is a judgment result corresponding to one of the attribute types; wherein a confidence of the judgment result satisfies a predetermined condition, and the attribute type corresponding to the identification result has the highest priority in the attribute types corresponding to the judgment results whose confidences satisfy the predetermined condition.

The confidence of the judgment result may be determined by a similarity obtained by a feature comparison. The higher the similarity, the higher the confidence. The "predetermined condition" may be defined based on the actual application scenario, and may be used for authenticating reliability of a judgment result. Specifically, the predetermined condition may be: The confidence of the judgment result may be greater than or equal to a confidence threshold corresponding to the attribute type corresponding to the judgment result. The confidence threshold corresponding to each attribute type may be the same. For example, the confidence thresholds corresponding to the attribute types "name", "gender" and "whether a person or not" are all 70%. If the acquired judgment results of the to-be-detected target include: Mr. Zhang (the confidence is 70%), "male" (the confidence is 89%), and "person" (the confidence is 100%), the confidences of the judgment results "Mr. Zhang", "male" and "person" all satisfy the predetermined condition. In this case, the identification result of the to-be-detected target is the judgment result "Mr. Zhang" corresponding to the attribute type "name" having the highest priority in the three identification results. Alternatively, in some other embodiments, the confidence threshold corresponding to each attribute type may also be different. For example, the confidence threshold corresponding to the attribute type "name" may be predefined to be 75%, the confidence threshold corresponding to the attribute type "gender" may be predefined to be 85%, and the confidence threshold corresponding to the attribute type "whether a person or not" may be predefined to be 95%. If the acquired judgment results of the to-be-detected target are likewise: "Mr. Zhang (the confidence is 70%), "male" (the confidence is 89%), and "person" (the confidence is 100%), the judgment results with the confidences satisfying the predetermined condition only include "male" and "person". In this case, the identification result of the to-be-detected target is the judgment result "male" corresponding to the attribute type "gender" having a higher priority in the two judgment results.

In this embodiment, based on the acquired judgment information (or based on the acquired judgment information and the information of the to-be-detected target acquired prior to acquisition of the judgment information), the acquiring the identification result of the to-be-detected target at the current time may be performed in, but not limited to, the following two implementation manners:

In a first implementation manner, based on the acquired judgment information (or based on the acquired judgment information and the information of the to-be-detected target acquired prior to acquisition of the judgment information), the judgment result corresponding to each attribute type of the to-be-detected target and the confidence of each judgment result are acquired; and then the judgment result corresponding to the attribute type having a highest priority in the judgment results with the confidences satisfying the predetermined condition is output as the identification result of the to-be-detected target.

In this implementation manner, the acquiring the judgment result corresponding to each attribute type of the to-be-detected target based on the acquired information (or based on the acquired judgment information and the information of the to-be-detected target acquired prior to acquisition of the judgment information) may be implemented by a suitable algorithm (for example, a neural network algorithm). For example, assuming that the to-be-detected target is a person, and the judgment information (or the acquired judgment information and the information of the to-be-detected target acquired prior to acquisition of the judgment information) acquired by the intelligent terminal is image information of the person, then the intelligent terminal may iteratively calculate judgment results corresponding to the attribute types "whether a person or not", "gender" and "name" from the image information. For example, firstly, the intelligent terminal calculates a feature 1 for judging the attribute type "whether a person or not" by a bottom layer of the neural network, and obtain the judgment result corresponding to the attribute type "whether a person or not" based on the feature 1; then the intelligent terminal calculates a feature 2 for judging the attribute type "gender" in a middle layer of the neural network based on the feature 1, and acquires the judgment result corresponding to the attribute type "gender" and the confidence of the judgment result based on the feature 2; and finally, the intelligent terminal calculates a feature 3 for judging the attribute type "name" in an uppermost layer of the neural network based on the feature 2, and acquires the judgment result corresponding to the attribute type "name" and the confidence of the judgment result based on the feature 3. After all the judgment results and the confidences thereof are acquired, firstly, the judgment results with the confidences satisfying the predetermined condition are screened out, and then the judgment result which is the most (that is, the corresponding attribute type has the highest priority) detailed (which has the highest detail degree) is selected as the judgment result of the to-be-detected target at the current time.

In a second implementation manner, based on the acquired judgment information (or based on the acquired judgment information and the information of the to-be-detected target acquired prior to acquisition of the judgment information), the judgment result corresponding to each attribute type of the to-be-detected target and the confidence of each judgment result are hieratically acquired in accordance with a descending order of the priorities, until a first judgment result with the confidence satisfying the predetermined condition appears. In this case, the first judgment result with the confidence satisfying the predetermined condition is output as the identification result of the to-be-detected target at the current time. That is, when the judgment information of the to-be-detected target is acquired (or when the acquired judgment information and the information of the to-be-detected target acquired prior to acquisition of the judgment information are obtained), firstly, based on the acquired information (or based on the acquired information and the information of the to-be-detected target acquired prior to acquisition of the judgment information), a first-level judgment result corresponding to the attribute type having the highest priority and a first-level confidence of the first-level judgment result are acquired. If the first-level confidence satisfies a predetermined condition (for example, if the first-level confidence is greater than or equal to a first-level confidence threshold), the first-level judgment result is directly output as the identification result of the to-be-detected target at the current time; and otherwise, a second-level judgment result corresponding to a next-level attribute type and a second-level confidence corresponding to the second-level judgment result are acquired based on the acquired judgment information. If the second-level confidence satisfies a predetermined condition (for example, the second-level confidence is greater than or equal to a second-level confidence threshold), the second-level judgment result is output as the identification result of the to-be-detected target at the current time; and otherwise, based on the acquired judgment information, the judgment result corresponding to a next-level attribute type and the confidence thereof are continuously acquired, and such process is repeated until a judgment result with the confidence satisfying the predetermined condition is acquired.

In this implementation manner, different features for different levels of judgments are extracted from the acquired judgment information (or the acquired judgment information and the information of the to-be-detected target acquired prior to acquisition of the judgment information). For example, assuming that the to-be-detected target is a vehicle, the acquired information is image information of the vehicle, then a feature a for identifying whether a vehicle is present in the image information, a feature b for identifying the color of the vehicle in the image information, and a feature c for identifying the type of the vehicle (automobile, truck, public bus or the like) are extracted from the image information.

In this implementation manner, the judgment result corresponding to each attribute type and the confidence thereof are hierarchically acquired in accordance with a descending order of priorities. When a first judgment result with the confidence satisfying the predetermined condition appears, the first judgment result with the confidence satisfying the predetermined condition is used as the identification result of the to-be-detected target at the current time, with no need of identifying and judging each attribute type one by one. In this way, the data processing amount may be reduced, and identification efficiency may be improved on the premise of not affecting the detail degree and reliability of the identification.

Further, in practice, for the sake of improving identification accuracy and identification efficiency, the acquired judgment information may also include at least two information sources. The "information source" refers to an information source reflecting the attribute of the to-be-detected target. The "at least two information sources" may be at least two different types of judgment information, for example, any two or more types of image information, sound information, thermal infrared picture, near infrared picture, ultrasonic signal and electromagnetic reflected signal; or the "at least two information resources" may be a specific type of information acquired from at least two angles, for example, image information (or sound information) of the to-be-detected target acquired from a plurality of angles, wherein the image information (or the sound information) acquired form each view angle may be used as an information source. Nevertheless, it may be understood that the "at least two information sources" may also be a combination of the above two forms. For example, the acquired judgment information includes the image information acquired from a plurality of angles and the sound information acquired from one angle.

When the acquired judgment information includes at least two information sources, likewise, by referring to the "feature fusion" or "result fusion" fashion as described above, the identification result of the to-be-detected target at the current time may be acquired based on the information sources.

In addition, with respect to some application scenarios where human-machine interaction may be employed, for example, smart blind guiding, courtesy robots, service robots or the like, the intelligent terminal may further send an interaction signal corresponding to the identification result upon outputting the identification result of the to-be-detected target at the current time.

For example, with respect to smart glasses or a smart helmet for blind guiding, if the identification result output at a first predetermined time node is "person", a voice prompt message "There is a person ahead" may be sent to a user at the first predetermined time node; if the identification result output at a second predetermined time node is "male", a voice prompt message "the person ahead is a male" may be continuously sent to the user at the second predetermined time node; and if the identification result output at a third predetermined time node is "Mr. Zhang", a voice prompt message "This man is Mr. Zhang" may be continuously sent to the user at the third predetermined time node.

Still for example, with respect to a courtesy or service robot, if the identification result output at the first predetermined time node is "person", "Hello, what can I do for you?" may be spoken to the to-be-detected target, and a universal service may be provided therefor; as the acquired information accumulates, if the identification result output at the second predetermined time node is "male", the content communicated with the to-be-detected target is adjusted to be content dedicated to the males, for example, "Do you want to find newest electronic products"; and if the identification result output at the third predetermined time mode is "Mr. Zhang", the content communicated with the to-be-detected target is continuously adjusted to content dedicated to Mr. Zhang, for example, "The product you concerned has arrived. Do you want a try?"

Step 130: Whether the attribute type corresponding to the identification result is an attribute type having the highest priority in at least two attribute types is judged.

In this embodiment, when an identification result is acquired at a predetermined time point, the identification result is output, and it is judged whether the attribute type corresponding to the identification result is the attribute type having the highest priority in the at least two attribute types. If the attribute type corresponding to the identification result is the attribute type having the highest priority in the at least two attribute types, step 140 is performed; and otherwise, step 150 is performed. For example, using person identification as an example, assuming that the identification result acquired at a predetermined time node is "male", the identification result "male" corresponds the attribute type "gender", and with respect to the person identification, the attribute type having the highest priority is "name", then, in this case the information of the to-be-detected target needs to be acquired, and step 150 needs to be performed.

Step 140: Information acquisition for the to-be-detected target is stopped.

When the identification result corresponding to the attribute type having the highest priority of the to-be-detected target is acquired at a predetermined time node, the most detailed identification result is acquired. Therefore, in this embodiment, for the sake of reducing unnecessary calculation load and power consumption, after the most detailed identification result is acquired, information acquisition for the to-be-detected target may be stopped.

Nevertheless, it may be understood that when the most detailed identification result is acquired at a predetermined time node, practice of stopping data acquisition for the to-be-detected target is only one of implementation manner. In practice, step 140 may also be performed in other ways. For example, in some embodiments, for the sake of ensuring accuracy of the identification result, when the identification result corresponding to the attribute type having the highest priority of the to-be-detected target at a predetermined time node, it may be firstly judged whether the identification result is a most detailed identification acquired at the first time. If the identification result is the most detailed identification acquired at the first time, step 150 is performed; and otherwise, a check is made between the most detailed identification result currently acquired and the most detailed identification result previously acquired. If the check is successful, information acquisition for the to-be-detected target is stopped; and otherwise, step 150 is continuously performed.

Step 150: Information of a to-be-detected target acquired within a predetermined time period is used as judgment information.

In this embodiment, if at a predetermined time node, for example, a first predetermined time node, the identification result corresponding to the attribute type having the highest priority of the to-be-detected target is not acquired, it indicates that in this case no most detailed identification result is acquired, and thus the to-be-detected target still needs to be further identified to acquire the most detailed identification result. Therefore, when the judgment result in step 130 is negative, the intelligent terminal may continuously acquire information of the to-be-detected target, and when a next predetermined time node arrives, for example, a second predetermined time node, the intelligent terminal uses the information of the to-be-detected target acquired within a next predetermined time period (that is, a time period between the second predetermined time node and the first predetermined time node) as the judgment information. The process returns to step 130, such that the intelligent terminal may acquire the identification result of the to-be-detected target within the "next predetermined time node" (the second predetermined time node).

As seen from the above technical solution, the embodiment of the present application achieves the following beneficial effects: With the target identification method according to the embodiment of the present application, based on different detail degrees of description of a to-be-detected target, attributes of the to-be-detected target are categorized into a plurality of attribute types having priorities. In addition, during identification, information of the to-be-detected target acquired within a predetermined time period is used as judgment information; an identification result of the to-be-detected target at a current time is acquired and output based on the judgment information and data acquired prior to acquisition of the judgment information; and if the priority of the attribute type corresponding to the identification result acquired at the current time is not the highest priority, which means, if the identification result acquired at the current time is not a most detailed identification result, information of the to-be-detected target is continuously acquired within a next predetermined time period, and the information is used as the judgment information. By repeating the above identification step and judgment step, an identification result of the to-be-detected target may be timely output in different identification scenarios. In addition, if the acquired identification result is not the most detailed identification result, with accumulation of the information acquisition time, a more detailed identification result may be output gradually based on more abundant information, such that a compromise may be reached between timeliness and detail degree of the target identification, and hence user experience may be enhanced.

Embodiment 2

Considering that in some practical application scenarios, it is likely that the same identification result is acquired at two contiguous predetermined time nodes, to prevent output of the same identification result and enhance user experience, a second embodiment of the present application further provides another target identification method. This method is different from the target identification method according to the above embodiment in that: Before an identification result is output, it needs to be further judged whether the priority of the attribute type corresponding to the identification result of the to-be-detected target at the current time is higher than that of the attribute type corresponding to the identification result of the to-be-detected target at the previous time. If the priority of the attribute type corresponding to the identification result of the to-be-detected target at the current time is higher than that of the attribute type corresponding to the identification result of the to-be-detected target at the previous time, the identification result is output; and otherwise, the identification result is not output.

Figure 2:
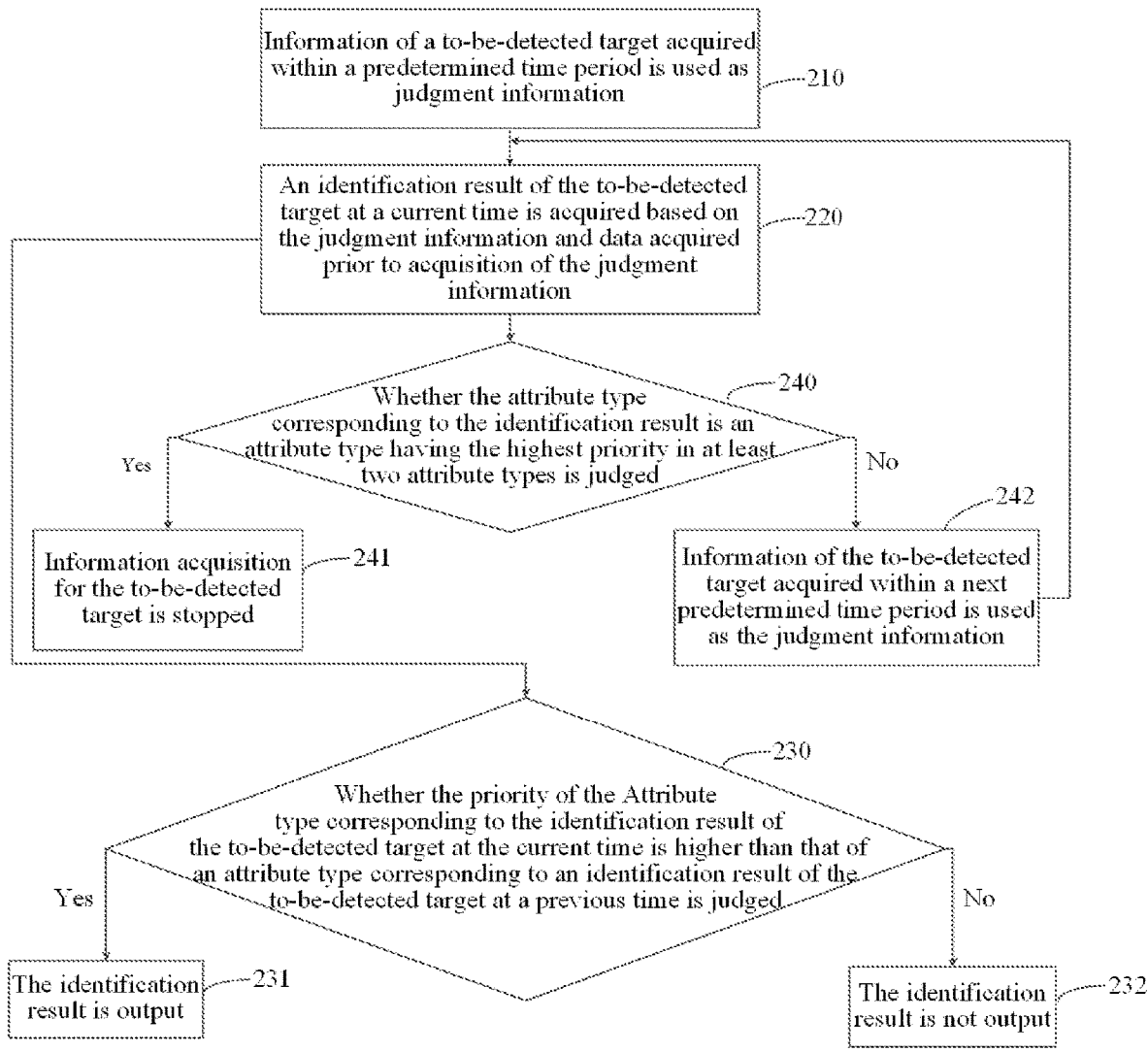
FIG. 2 is a schematic flowchart of another target identification method according to an embodiment of the present application.

Specifically, FIG. 2 is a schematic flowchart of another target identification method according to an embodiment of the present application. The method may include, but not limited to, the following steps:

Step 210: Information of a to-be-detected target acquired within a predetermined time period is used as judgment information.

Step 220: An identification result of the to-be-detected target at a current time is acquired based on the judgment information and data acquired prior to acquisition of the judgment information.

In this embodiment, after the identification result of the to-be-detected target at a predetermined time point is acquired, step 230 and step 240 are performed simultaneously.

Step 230: Whether the priority of the attribute type corresponding to the identification result of the to-be-detected target at the current time is higher than that of an attribute type corresponding to an identification result of the to-be-detected target at a previous time is judged.

In this embodiment, when the identification result of the to-be-detected target at a predetermined time node (that is, the current time) is acquired, firstly, whether the priority of the attribute type corresponding to the identification result acquired by the intelligent terminal at the predetermined time node (that is, the current time) is higher than that of the attribute type corresponding to the identification result acquired by the intelligent terminal at a previous predetermined time node (that is, the previous time) is judged. If the priority of the attribute type corresponding to the identification result acquired by the intelligent terminal at the predetermined time node is higher than that of the attribute type corresponding to the identification result acquired by the intelligent terminal at the previous predetermined time node, it indicates that the identification result acquired at the current time is more detailed than the identification result acquired at the previous time, and thus step 231 is performed to output the identification result acquired at the current time; and otherwise, step 232 is performed to not output the identification result acquired at the current time.

Step 231: The identification result is output.

Step 232: The identification result is not output.

Step 240: Whether the attribute type corresponding to the identification result is an attribute type having the highest priority in at least two attribute types is judged.

In this embodiment, step 240 may be performed synchronously with step 230. If the attribute type corresponding to the identification result is the attribute type having the highest priority in the at least two attribute types, step 241 is performed; and otherwise, step 242 is performed.

Step 241: Information acquisition for the to-be-detected target is stopped.

Step 242: Information of the to-be-detected target acquired within a next predetermined time period is used as the judgment information, and the process returns to step 220.

It should be noted that, in this embodiment, steps 210, 220, 240, 241, and 242 have the same or similar technical feature as steps 110, 120, 130, 140, and 150 respectively.

Therefore, the specific implementation manners in the first embodiment are also applicable to this embodiment, which are not described herein any further.

As seen from the above technical solution, the embodiment of the present application achieves the following beneficial effects: With the target identification method according to the embodiment of the present application, before an identification result is output, whether the priority of the attribute type corresponding to the identification result of the to-be-detected target at the current time is higher than that of the attribute type corresponding to the identification result of the to-be-detected target at the previous time is judged firstly. If the priority of the attribute type corresponding to the identification result of the to-be-detected target at the current time is higher than that of the attribute type corresponding to the identification result of the to-be-detected target at the previous time, the identification result is output. In this way, repeated outputs of the same identification result and confusions caused to the user may be prevented, and thus user experience may be enhanced.

Embodiment 3

Figure 3:
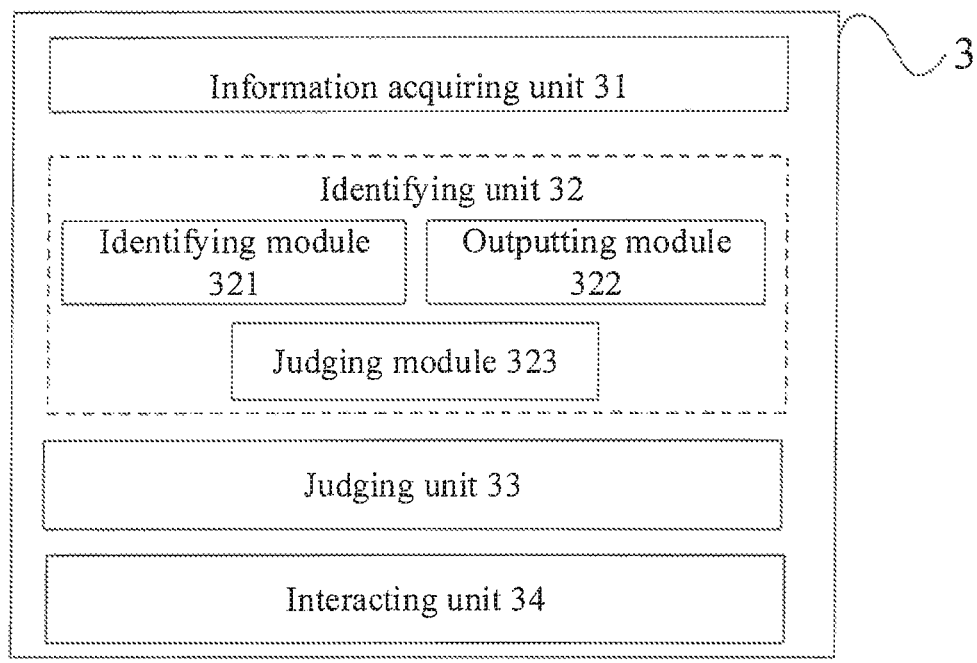
FIG. 3 is a schematic structural diagram of a target identification apparatus according to an embodiment of the present application.

FIG. 3 is a schematic structural diagram of a target identification apparatus 3 according to an embodiment of the present application. Referring to FIG. 3, the target identification apparatus 3 includes: an information acquiring unit 31, an identifying unit 32 and a judging unit 33.

The information acquiring unit 31 is configured to use information of a to-be-detected target acquired within a predefined time period as judgment information, wherein the to-be-detected target includes at least two attribute types, a priority relationship being defined between the at least two attribute types.

The identifying unit 32 includes: an identifying module 321 and an outputting module 322. The identifying module 321 is configured to acquire an identification result of the to-be-detected target at a current time based on the judgment information and data acquired prior to acquisition of the judgment information; and the outputting module 322 is configured to output the identification result, the identification result corresponding to one of the attribute types. In some embodiments, the identification result is a judgment result corresponding to one of the attribute types; wherein a confidence of the judgment result satisfies a predetermined condition, and the attribute type corresponding to the identification result has the highest priority in the attribute types corresponding to the judgment results whose confidences satisfy the predetermined condition.

The judging unit 33 is configured to judge whether the attribute type corresponding to the identification result is an attribute type having the highest priority in the at least two attribute types; and if the attribute type corresponding to the identification result is not the attribute type having the highest priority in the at least two attribute types, the control information acquiring unit 31 is configured to use information of the to-be-detected target acquired within a next predetermined time period as the judgment information and send the judgment information to the identifying unit 32.

In this embodiment, when target identification is needed, firstly, the information acquiring unit 31 acquires the information of the to-be-detected target, and inputs the information of the to-be-detected target acquired within the predetermined time period to the identifying unit as the judgment information; in the identifying unit 32, the identifying module 321 acquires the identification result of the to-be-detected target at the current time based on the judgment information and the data acquired prior to acquisition of the judgment information, and the outputting module 322 outputs the identification result; the judging unit 33 judges whether the attribute type corresponding to the identification result is the attribute type having the highest priority in the at least two attribute types; if the attribute type corresponding to the identification result is not the attribute type having the highest priority in the at least two attribute types, the information acquiring unit 31 is controlled to send the judgment information of the to-be-detected target acquired at the next predetermined time period to the identifying unit 32 as the judgment information.

In some embodiments, the data acquired prior to acquisition of the judgment information includes information of the to-be-detected target acquired prior to acquisition of the judgment information; and in this case, the identifying module 321 is specifically configured to: fuse features of the judgment information and the information of the to-be-detected target acquired prior to acquisition of the judgment information; and acquire the identification result of the to-be-detected target at the current time based on a fused feature.

In some embodiments, the data acquired prior to acquisition of the judgment information includes an identification result acquired prior to acquisition of the judgment information; and in this case, the identifying module 321 is specifically configured to: acquire an identification result corresponding to the judgment information; and select an identification result having a higher priority from the identification result corresponding to the judgment information and the identification result acquired prior to acquisition of the judgment information as the identification result of the to-be-detected target at the current time.

In some embodiments, the identifying unit 32 further includes: a judging module 323.

The judging module 323 is configured to judge whether the priority of the attribute type corresponding to the identification result of the to-be-detected target at the current time is higher than that of an attribute type corresponding to an identification result of the to-be-detected target at a previous time; and the outputting module 322 is configured to output the identification result if the priority of the attribute type corresponding to the identification result of the to-be-detected target at the current time is higher than that of the attribute type corresponding to the identification result of the to-be-detected target at the previous time, and otherwise, the outputting module 322 is not configured to output the identification result.

In addition, in some embodiments, the target identifying apparatus 3 further includes:

An interacting unit 34, configured to send an interaction signal corresponding to the identification result.

It should be noted that since the target identification apparatus and the target identification method according to the above method embodiments are based on the same inventive concept, corresponding content disclosed the above method embodiments and the beneficial effects thereof also apply to the apparatus embodiment, which are not described herein any further.

As seen from the above technical solutions, the embodiment of the present application achieves the following beneficial effects: With the target identification apparatus according to the embodiment of the present application, based on different detail degrees of description of a to-be-detected target, attributes of the to-be-detected target are categorized into a plurality of attribute types having priorities. In addition, during identification, the information acquiring unit 31 uses information of the to-be-detected target acquired within a predetermined time period as the judgment information; the identifying unit 32 acquires and outputs an identification result of the to-be-detected target at a current time based on the judgment information and data acquired prior to acquisition of the judgment information; and the judging unit 33 judges whether the priority of the attribute type corresponding to the identification result acquired at the current time is the highest priority. If the priority of the attribute type corresponding to the identification result acquired at the current time is the highest priority, the information acquiring unit 31 is controlled to continuously acquire information of the to-be-detected target within a next predetermined time period, and send the information to the identifying unit 32 as the judgment information. In this way, an identification result of the to-be-detected target may be timely output in different identification scenarios. In addition, if the acquired identification result is not the most detailed identification result, with accumulation of the information acquisition time, a more detailed identification result may be output gradually based on more abundant information, such that a compromise may be reached between timeliness and detail degree of the target identification, and hence user experience may be enhanced.

Embodiment 4

Figure 4:
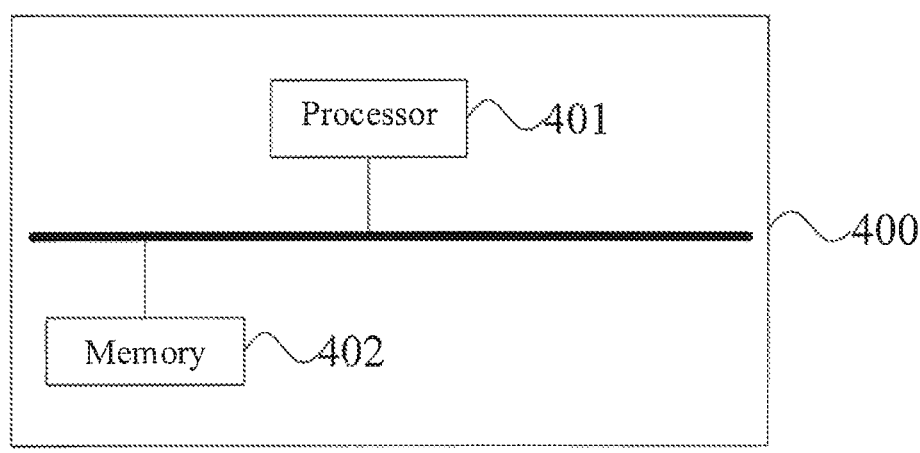
FIG. 4 is a schematic structural diagram of an intelligent terminal according to an embodiment of the present application.

FIG. 4 is a schematic structural diagram of hardware of an intelligent terminal 400 according to an embodiment of the present application. The intelligent terminal 400 may be any type of intelligent terminals, for example, a robot, blind guiding glasses, a smart helmet, a smart phone, a tablet computer, a server or the like, which is capable of performing the target identification methods according to Embodiment 1 and Embodiment 2 of the present application.

Specifically, referring to FIG. 4, the intelligent terminal 400 includes:

At least one processor 401 and a memory 402, wherein FIG. 4 uses one processor 401 as an example.

The at least one processor 401 and the memory 402 may be connected via a bus or in another manner, and FIG. 4 uses the bus as an example.

The memory 402, as a non-transitory computer readable storage medium, may be configured to store non-transitory software programs, non-transitory computer-executable programs and modules, for example, the program instructions/modules corresponding to the target identification methods in the embodiments of the present application (for example, the information acquiring unit 31, the identifying unit 32 and the interacting unit 34 as illustrated in FIG. 3). The non-transitory software programs, instructions and modules stored in the memory 402, when being executed, cause the processor 401 to perform various function applications and data processing of the target identification apparatus, that is, performing the target identification method according to the above method embodiments.

The memory 402 may include a program memory area and data memory area, wherein the program memory area may store operating systems and at least one needed application program; and the data memory area may store data created according to the usage of the target identification apparatus. In addition, the memory 402 may include a high speed random access memory, or include a non-transitory memory, for example, at least one disk storage device, a flash memory device, or another non-transitory solid storage device. In some embodiments, the memory 402 optionally includes memories remotely configured relative to the processor 401. These memories may be connected to the intelligent terminal 400 over a network. Examples of the above network include, but not limited to, the Internet, Intranet, local area network, mobile communication network and a combination thereof.

One or a plurality of modules are stored in the memory 402, and when being executed by the at least one processor 401, performing the target identification method according to any of the above method embodiments, for example, performing steps 110 to 150 in the method as illustrated in FIG. 1 and steps 210 to 242 in the method as illustrated in FIG. 2, and implementing the functions of units 31 to 34 in the apparatus as illustrated in FIG. 3.

Embodiment 5

An embodiment of the present application further provides a non-transitory computer-readable storage medium. The computer readable storage medium stores computer-executable instructions, which, when being executed by at least one processor, for example, the processor 401 as illustrated in FIG. 4, cause the at least one processor to perform the target identification method in any of the above method embodiments, for example, performing steps 110 to 150 in the method as illustrated in FIG. 1, and steps 210 to 242 in the method as illustrated in FIG. 2; and implementing the functions of units 31 to 34 as illustrated in FIG. 3.

The above described apparatus embodiment is merely for illustration purpose only. The units which are described as separate components may be physically separated or may be not physically separated, and the components which are illustrated as units may be or may not be physical units, that is, the components may be located in the same position or may be distributed into a plurality of network units. A part or all of the modules may be selected according to the actual needs to achieve the objectives of the technical solutions of the embodiments.

According to the above embodiments of the present application, a person skilled in the art may clearly understand that the embodiments of the present application may be implemented by means of hardware or by means of software plus a necessary general hardware platform. Persons of ordinary skill in the art may understand that all or part of the steps of the methods in the embodiments may be implemented by a program instructing relevant hardware. The program may be stored in a non-transitory computer-readable storage medium and may be executed by at least one processor. When the program runs, the steps of the methods in the embodiments are performed. The storage medium may be any medium capable of storing program codes, such as read-only memory (ROM), a random access memory (RAM), a magnetic disk, or a compact disc-read only memory (CD-ROM).

The product may perform the target identification methods according to the embodiments of the present application, has corresponding function modules for performing the method, and achieves the corresponding beneficial effects. For technical details that are not illustrated in detail in this embodiment, reference may be made to the description of the target identification methods according to the embodiments of the present application.

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A target identification method, applied to an intelligent terminal, the method comprising:
    using information of a to-be-detected target acquired within a predetermined time period as judgment information, the to-be-detected target comprising at least two attribute types, a priority relationship being defined between the at least two attribute types;
    acquiring an identification result of the to-be-detected target at a current time based on the judgment information and data acquired prior to acquisition of the judgment information;
    outputting the identification result, the identification result corresponding to one of the attribute types;
    judging whether the attribute type corresponding to the identification result is an attribute type having the highest priority in the at least two attribute types; and
    if the attribute type corresponding to the identification result is not the attribute type having the highest priority in the at least two attribute types, using information of the to-be-detected target acquired within a next predetermined time period as the judgment information, and returning to the step of acquiring an identification result of the to-be-detected target at a current time based on the judgment information and data acquired prior to acquisition of the judgment information and outputting the identification result.

2. The target identification method according to claim 1, wherein the data acquired prior to acquisition of the judgment information comprises information of the to-be-detected target acquired prior to acquisition of the judgment information; and
    the acquiring the identification result of the to-be-detected target at the current time based on the judgment information and data acquired prior to acquisition of the judgment information comprises:
    fusing features of the judgment information and the information of the to-be-detected target acquired prior to acquisition of the judgment information; and
    acquiring the identification result of the to-be-detected target at the current time based on a fused feature.

3. The target identification method according to claim 1, wherein the data acquired prior to acquisition of the judgment information comprises an identification result acquired prior to acquisition of the judgment information;
    the acquiring the identification result of the to-be-detected target at the current time based on the judgment information and data acquired prior to acquisition of the judgment information comprises:
    acquiring an identification result corresponding to the judgment information; and
    selecting an identification result corresponding to an attribute type having a higher priority from the identification result corresponding to the judgment information and the identification result acquired prior to acquisition of the judgment information as the identification result of the to-be-detected target at the current time.

4. The target identification method according to claim 1, wherein the identification result is a judgment result corresponding to one of the attribute types; wherein a confidence of the judgment result satisfies a predetermined condition, and the attribute type corresponding to the identification result has a highest priority in the attribute types corresponding to the judgment results whose confidences satisfy the predetermined condition.

5. The target identification method according to claim 1, wherein prior to the step of outputting the identification result, the method further comprises:
    judging whether the priority of the attribute type corresponding to the identification result of the to-be-detected target at the current time is higher than that of an attribute type corresponding to an identification result of the to-be-detected target at a previous time; and
    outputting the identification result if the priority of the attribute type corresponding to the identification result of the to-be-detected target at the current time is higher than that of the attribute type corresponding to the identification result of the to-be-detected target at the previous time.

6. The target identification method according to claim 1, wherein upon the step of outputting the identification result, the method further comprises:
    sending an interaction signal corresponding to the identification result.

7. An intelligent terminal, comprising:
    at least one processor; and
    a memory communicably connected to the at least one processor; wherein
    the memory stores instructions executable by the at least one processor, wherein, the instructions, when being executed by the at least one processor, cause the at least one processor to perform the steps of:
    using information of a to-be-detected target acquired within a predetermined time period as judgment information, the to-be-detected target comprising at least two attribute types, a priority relationship being defined between the at least two attribute types;
    acquiring an identification result of the to-be-detected target at a current time based on the judgment information and data acquired prior to acquisition of the judgment information;
    outputting the identification result, the identification result corresponding to one of the attribute types;
    judging whether the attribute type corresponding to the identification result is an attribute type having the highest priority in the at least two attribute types; and
    if the attribute type corresponding to the identification result is not the attribute type having the highest priority in the at least two attribute types, using information of the to-be-detected target acquired within a next predetermined time period as the judgment information, and returning to the step of acquiring an identification result of the to-be-detected target at a current time based on the judgment information and data acquired prior to acquisition of the judgment information and outputting the identification result.

8. The intelligent terminal according to claim 7, wherein the data acquired prior to acquisition of the judgment information comprises information of the to-be-detected target acquired prior to acquisition of the judgment information; when the instructions being executed by the at least one processor, cause the at least one processor to perform the steps of:
    fusing features of the judgment information and the information of the to-be-detected target acquired prior to acquisition of the judgment information; and
    acquiring the identification result of the to-be-detected target at the current time based on a fused feature.

9. The intelligent terminal according to claim 7, wherein the data acquired prior to acquisition of the judgment information comprises an identification result acquired prior to acquisition of the judgment information; when the instructions being executed by the at least one processor, cause the at least one processor to perform the steps of:
    acquiring an identification result corresponding to the judgment information; and
    selecting an identification result corresponding to an attribute type having a higher priority from the identification result corresponding to the judgment information and the identification result acquired prior to acquisition of the judgment information as the identification result of the to-be-detected target at the current time.

10. The intelligent terminal according to claim 7, wherein the identification result is a judgment result corresponding to one of the attribute types; wherein a confidence of the judgment result satisfies a predetermined condition, and the attribute type corresponding to the identification result has a highest priority in the attribute types corresponding to the judgment results whose confidences satisfy the predetermined condition.

11. The intelligent terminal according to claim 7, when the instructions being executed by the at least one processor, cause the at least one processor to perform the steps of:
    judging whether the priority of the attribute type corresponding to the identification result of the to-be-detected target at the current time is higher than that of an attribute type corresponding to an identification result of the to-be-detected target at a previous time; and
    outputting the identification result if the priority of the attribute type corresponding to the identification result of the to-be-detected target at the current time is higher than that of the attribute type corresponding to the identification result of the to-be-detected target at the previous time.

12. The intelligent terminal according to claim 7, when the instructions being executed by the at least one processor, cause the at least one processor to perform the step of:
    sending an interaction signal corresponding to the identification result.

13. A non-transitory computer readable storage medium, wherein the non-transitory computer-readable storage medium stores computer-executable instructions, which, when being executed by an intelligent terminal, cause the intelligent terminal to perform the steps of:
    using information of a to-be-detected target acquired within a predetermined time period as judgment information, the to-be-detected target comprising at least two attribute types, a priority relationship being defined between the at least two attribute types;
    acquiring an identification result of the to-be-detected target at a current time based on the judgment information and data acquired prior to acquisition of the judgment information;
    outputting the identification result, the identification result corresponding to one of the attribute types;
    judging whether the attribute type corresponding to the identification result is an attribute type having the highest priority in the at least two attribute types; and
    if the attribute type corresponding to the identification result is not the attribute type having the highest priority in the at least two attribute types, using information of the to-be-detected target acquired within a next predetermined time period as the judgment information, and returning to the step of acquiring an identification result of the to-be-detected target at a current time based on the judgment information and data acquired prior to acquisition of the judgment information and outputting the identification result.

14. The non-transitory computer readable storage medium according to claim 13, wherein the data acquired prior to acquisition of the judgment information comprises information of the to-be-detected target acquired prior to acquisition of the judgment information; when the instructions being executed by the intelligent terminal, cause the intelligent terminal to perform the steps of:
    fusing features of the judgment information and the information of the to-be-detected target acquired prior to acquisition of the judgment information; and
    acquiring the identification result of the to-be-detected target at the current time based on a fused feature.

15. The non-transitory computer readable storage medium according to claim 13, wherein the data acquired prior to acquisition of the judgment information comprises an identification result acquired prior to acquisition of the judgment information; when the instructions being executed by the intelligent terminal, cause the intelligent terminal to perform the steps of:
    acquiring an identification result corresponding to the judgment information; and
    selecting an identification result corresponding to an attribute type having a higher priority from the identification result corresponding to the judgment information and the identification result acquired prior to acquisition of the judgment information as the identification result of the to-be-detected target at the current time.

16. The non-transitory computer readable storage medium according to claim 13, wherein the identification result is a judgment result corresponding to one of the attribute types; wherein a confidence of the judgment result satisfies a predetermined condition, and the attribute type corresponding to the identification result has a highest priority in the attribute types corresponding to the judgment results whose confidences satisfy the predetermined condition.

17. The non-transitory computer readable storage medium according to claim 13, when the instructions being executed by the intelligent terminal, cause the intelligent terminal to perform the steps of:
    judging whether the priority of the attribute type corresponding to the identification result of the to-be-detected target at the current time is higher than that of an attribute type corresponding to an identification result of the to-be-detected target at a previous time; and
    outputting the identification result if the priority of the attribute type corresponding to the identification result of the to-be-detected target at the current time is higher than that of the attribute type corresponding to the identification result of the to-be-detected target at the previous time.

18. The non-transitory computer readable storage medium according to claim 13, when the instructions being executed by the intelligent terminal, cause the intelligent terminal to perform the step of:

sending an interaction signal corresponding to the identification result.

* * * * *